Patented July 18, 1933

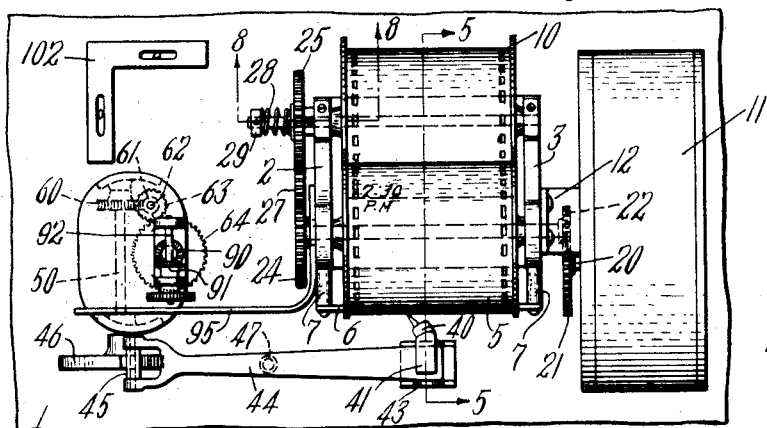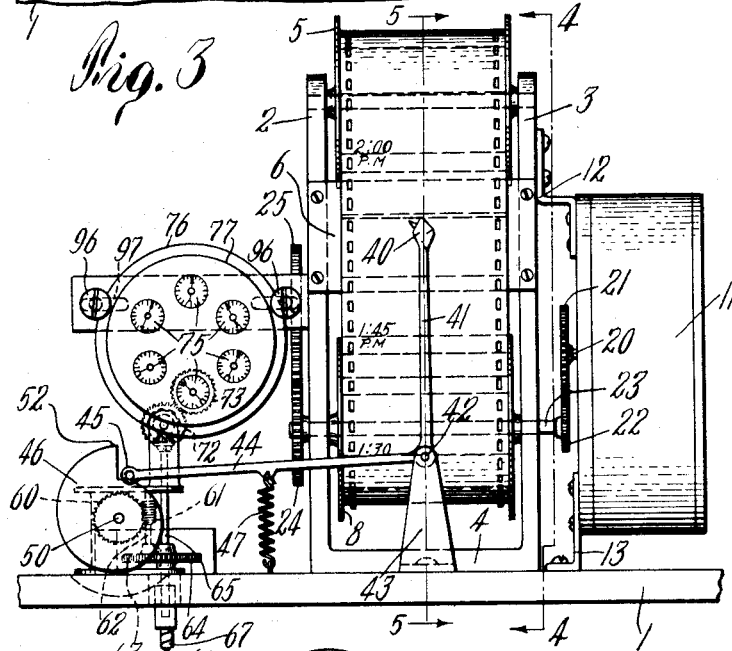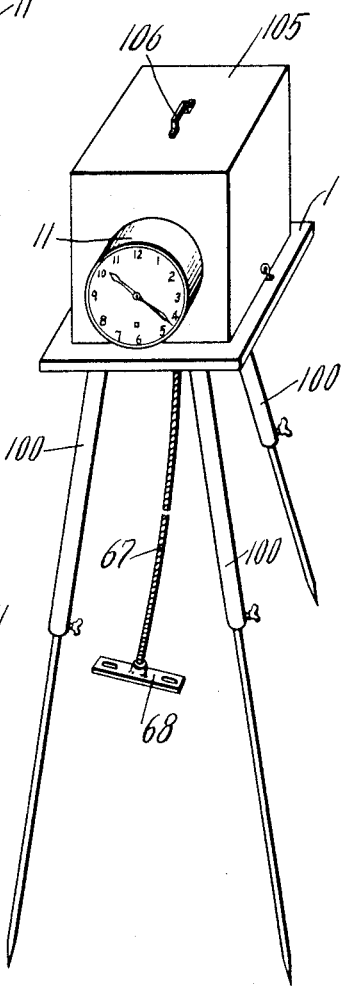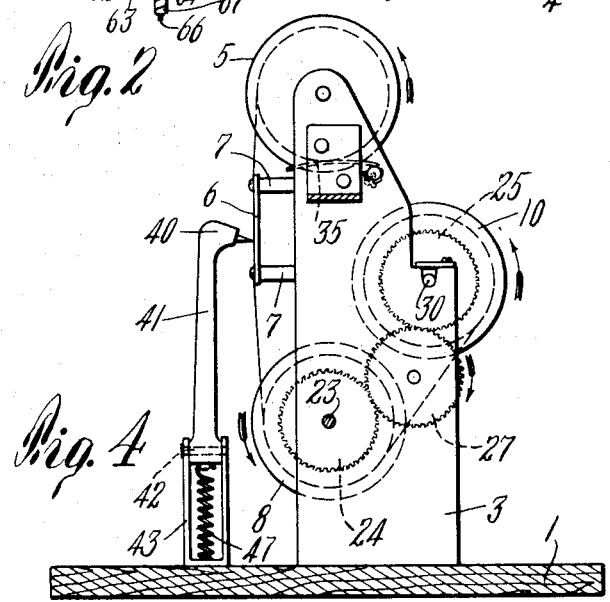

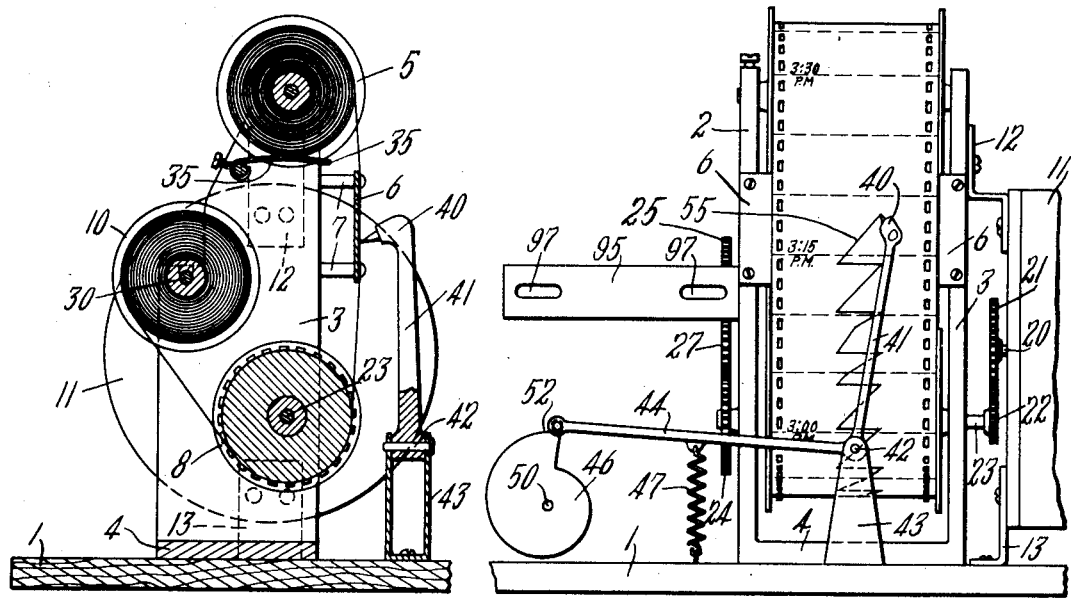
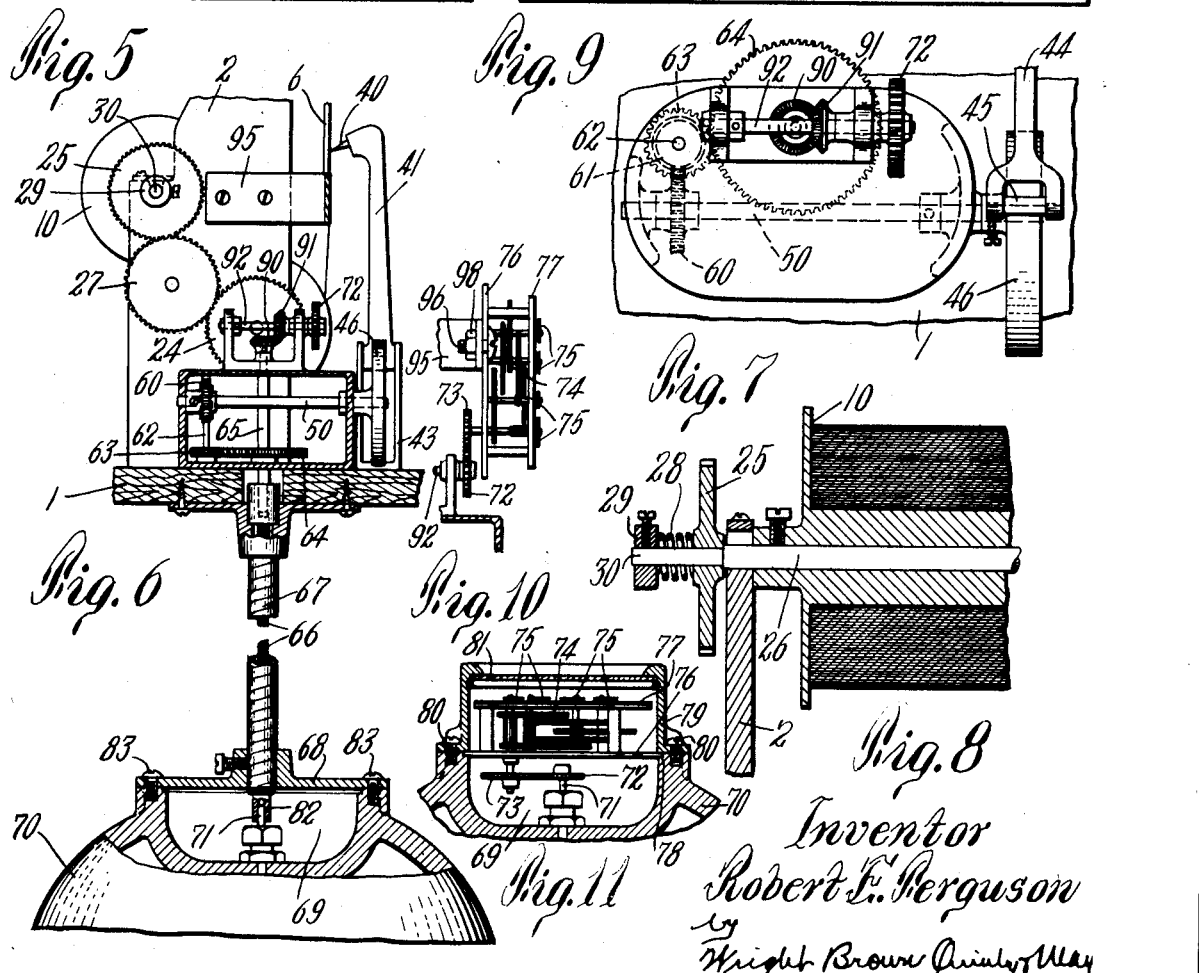

1,918,388

UNITED STATES PATENT OFFICE

ROBERT E. FERGUSON, OF MEDFORD, MASSACHUSETTS

FLOW RECORDING MECHANISM

Application filed July 16, 1931. Serial No. 551,074.

This invention relates to mechanism for producing a flow record in connection with a meter, and more particularly though not restricted thereto, in connection with a water meter. The proper capacity of a water meter suitable for any particular installation is determined by the character of the flow it is called upon to register. Thus, if the maximum flow is small a small capacity meter should be used, since a large capacity meter might fail to properly register a small flow. If, however, whenever a flow occurs it is large, the small capacity meter might unduly restrict the flow, even though over an extended period the total amount of water passed through the meter might be as large or even larger with a small flow at any one time than with shorter periods of large flow. It has been customary practice to test out meters for suitable capacity by stationing a man at the meter, this man taking meter readings at suitable intervals say, every five minutes, over a sufficiently extended period so that by plotting the meter indications against time the general character of the service to which the meter is subjected may be determined. This is a slow, expensive method, dependent for accuracy of results on the faithfulness and accuracy of the observer, and fails to show the rate of flow between observations.

According to the present invention a continuous record is made by temporarily attaching a recorder to the meter, and more particularly interposing it between the meter and its registering mechanism. The registering mechanism thus continues to register the flow in its usual course, while the recorder makes a continuous record showing the rate of flow. By an examination of this record the service to which the meter is subjected may be accurately ascertained and without the necessity of the services of an observer who may thus be released for other work.

For a more complete understanding of this invention, reference may be had to the accompanying drawings in which Figure 1 is a perspective of a recorder constructed in accordance with this invention.

Figure 2 is a side elevation of the recording mechanism.

Figure 3 is a top plan of the same.

Figures 4 and 5 are sections on lines 4—4 and 5—5, respectively, of Figure 2.

Figure 6 is a view partly in vertical section showing the recorder operatively attached to a meter.

Figure 7 is a fragmentary top plan of pen or stylus driving mechanism but to a larger scale than Figure 3

Figure 8 is a detail section on line 8—8 of Figure 3.

Figure 9 is a fragmentary elevation similar to a portion of Figure 3 but showing the character of the record made Figure 10 is a detail partly in section and partly in edge elevation showing the attachment of the meter register to the recorder.

Figure 11 is a fragmentary vertical section through the upper portion of a water meter showing the register mechanism in position.

The recorder, as shown, comprises a base 1 having upstanding therefrom a pair of spaced supports 2 and 3, having an integral connecting member 4 at their lower ends. At the upper portion of these supports 3 is carried a supply reel 5 from which a strip of paper or other suitable sheet material may be drawn off downwardly and in front of a plate 6 supported by suitable posts 7 carried by the supports 2 and 3, by a winding roll 8. After passing about the winding roll 8 the paper passes upwardly to a winding reel 10 also journaled in the supports 2 and 3. As shown the reels and winding roll have end flanges to retain the strip of paper in position.

The winding roll 8 and the reel 10 are driven in any suitable way by clock mechanism at 11 which is shown as carried by brackets 12 and 13 from the support 3 and the base 1, respectively. As shown best in Figure 2 the clock drives a shaft 20 having a gear 21 thereon which meshes with a gear 22 on the shaft 23 of the winding roll 8 and through a gear 24 at the opposite end of the shaft 23 through an idler gear 27, with a gear 25 journaled on the shaft 26 (see Figure 8) of the winding reel 10. This gear 25 is in frictional driving relation to the shaft 26. As shown this is accomplished by interposing a spring 28 between one face of the gear 25 and a collar 29 secured to the outer end of the shaft 26. The gear 25 is journaled on a reduced extremity 30 of the shaft 26 so that the spring 28 thus holds this gear 25 against a shoulder at the inner end of the reduced portion. This connection provides sufficient frictional drag to cause the shaft 26 to turn to wind up the paper under suitable tension as it is supplied thereto by the winding roll 8. The gear ratio between the gears 25 and 21 is so proportioned, however, as to drive the winding drum at the maximum permitted at any time by the feed of paper thereto to the winding roll 8, but the friction connection permits the winding reel to slip as soon as the desired tension on the paper is produced. To prevent the overrunning of the supply roll, braking means such as a spring 35 bearing on the paper on the supply reel may be employed as shown in Figure 4. The paper is thus drawn progressively across the surface of the plate 6 at a uniform rate determined by the rotation of the clock shaft 20.

The record on the paper is traced by a stylus or pen at 40 supported at the upper end of an arm 41 of a bell crank lever fulcrumed at 42 to a post 43 upstanding from the base 1. The opposite arm of the bell crank lever as 44 carries a cam follower 45 which rides on the edge of a spiral edge cam 46 and the arm 44 may be held downwardly to hold the follower against the cam edge by any suitable means such as the spring 47. At each rotation of the shaft 50 which carries the cam 46, the bell crank lever is caused to rock in a direction to cause the pen or stylus to move transversely of the direction of motion of the paper to draw a line thereon and at the completion of each complete rotation of the cam 46 the cam follower arrives at the high point 52 of the cam, as shown in Figure 9, from which it is brought down to the low point into the position shown in Figure 2, this acting to return the stylus or pen quickly to its original lateral position. The rotation of the cam 46 is controlled by the flow of the material to be recorded so that the line traced by the pen or stylus, as shown at 55 in Figure 9, shows with relation to the lengthwise travel of the paper between the sudden jogs of the record the rate of flow at any given period. The paper may have cross lines thereon, indicating intervals of time to facilitate study of the diagram produced by the recorder.

The shaft 50 which carries the cam 46 is shown as provided with a worm wheel 60 with which meshes a worm 61 on a vertical shaft 62. This shaft is connected by intermeshing gears 63 and 64 with a vertical shaft 65 which extends downwardly through the base 1 and has coupled thereto at its lower end a flexible shaft 66 extending through a suitable protective flexible tube 67. To the lower end of the flexible tube is shown attached a plate member 68.

At 70 is shown a water meter of conventional type having a rotatable spindle 71 projecting upwardly into a pocket 69 at the upper end of the meter. As shown in Figure 11 the spindle 71 normally carries at its upper end a readily removable pinion 72 which meshes with a pinion 73 of a register mechanism shown generally at 74 and which is provided on its upper face with suitable dials 75. This register mechanism, as shown, is provided with spaced plates 76 and 77, the plate 76 being of larger diameter than the plate 77, and fitting into a counterbored portion 78 at the top of the pocket 69 within which it may be secured by a hood 79 made fast as by screws 80 to the upper edge of the meter and carrying at its upper end a window 81 through which the dials 75 may be observed. When the recorder of the present invention is to be employed, this register mechanism is removed from the top of the meter and the gear 72 is removed from the upper end of the spindle 71. The coupling 82 at the lower end of the flexible shaft 76 is then engaged with the spindle 71 and the plate 68 is secured to the upper edge of the meter as by screws 83 which take the place of the screws 80 normally used for securing the register hood 79 in position. Rotation of the meter spindle is then effective to rotate the shaft 65 and through the connections hereinbefore described to rotate the cam 46 thus to produce lateral motion of the pen arm to cause a record to be made of the flow through the meter.

It is, however, desirable that the meter register mechanism continue to register the flow while the recorder is in use. To this end the drive shaft 65 of the recorder, which with its immediate mounting forms a recorder driving unit, is shown as carrying at its upper end a bevel gear 90 which meshes with a similar gear 91 fixed to a horizontal shaft 92. This shaft 92 is so formed as to receive the pinion 72 which was removed from the spindle 71 to permit the recorder to be placed in position, and the standard 2 has secured thereto an angle bracket or support 95 against which the plate 76 of the register mechanism may be secured as by means of the screws 96, the heads of which engage the forward or upper face of the plate 76 and are passed through slots 97 through the support 95. These screws 96 are provided with nuts 98 on their rear ends. The register may thus be fixed to the recorder with its driving gear 73 in registry with the gear 72, as shown in Figure 10, so that the register may be driven while the recorder is interposed between it and the meter and at the same rate as though it were in the normal position driven directly by the meter spindle.

As shown in Figure 1 the meter base 1 may be supported by adjustable legs 100 from the floor or ground and it may be provided if desired with spirit levels shown at 102 on Figure 3 to facilitate adjustment of the base 1 to horizontal position which may be desirable particularly with certain types of clocks such as those provided with pendulums.

When the recorder is to be used it is only necessary that the register mechanism of the meter be momentarily removed, the flexible shaft of the recorder attached to the meter spindle, and then that the register be attached to the recorder in position to register flow while the recorder is in use.

The recorder may be provided with a casing 105 enclosing the pen and paper feed mechanism and which may be secured to the base 1 and provided with a suitable handle 106 by which the entire mechanism may be carried as desired.

From the foregoing description of an embodiment of this invention, it should be evident to those skilled in the art that various modifications and changes might be made without departing from the spirit or scope of this invention as defined by the appended claims.

I claim:

1. The combination with a meter having a spindle and a removable register normally driven by said spindle, of a recorder associable with said meter and having driving means driven by said spindle when said register has been removed, means carried by said recorder for supporting said register, and driving means carried by said recorder for driving said register when so supported and at the same rate as though said register were driven by said spindle in normal operation.

2. The combination with a meter having a spindle and a removable register normally driven by said spindle, of a recorder having a drive shaft, recording mechanism actuated by said shaft, a flexible shaft coupled at one end to said drive shaft, means for fixing the opposite end of said flexible shaft to said meter in place of said register and in driven relation to said spindle, a shaft driven by said drive shaft, and a support carried by said recorder for carrying said register in operative driven relation to said driven shaft.

3. A recorder comprising a base, a pair of spaced supports upstanding from said base, a pair of reels for supporting a supply of paper and for winding up said paper, respectively, carried by said support, a feeding roll carried by said supports for taking paper from said supply roll and delivering it to said winding reel, clock mechanism for driving said feeding roll and winding reel, a bell crank lever having a stylus on one arm movable laterally of the direction of travel of said paper between said supply reel and feed roll to mark transversely thereon as said lever is rocked, a cam shaft, a spiral edge cam fixed to said shaft, a follower riding on said cam and carried by the other arm of said lever, means for driving said shaft, and means for supporting a register in driven relation to said shaft.

4. A recorder comprising a base, a pair of spaced supports upstanding from said base, a pair of reels for supporting a supply of paper and for winding up said paper respectively carried by said supports, a feeding roll carried by said supports for taking paper from said supply reel and delivering it to said winding reel, clock mechanism for driving said feeding roll and winding reel, a bell crank lever having a stylus on one arm movable laterally of the direction of travel of the paper between said supply reel and feed roll to mark transversely thereon as said lever is rocked, a cam shaft, a spiral edge cam fixed to said shaft, a follower riding on said cam and carried by the other arm of said lever, a drive shaft extending upwardly through said base, a flexible shaft fixed to the lower end of said drive shaft, driving connections from said drive shaft to said cam shaft, a register support carried by one of said spaced supports, driving connections from said drive shaft to a register carried by said register support, and means for connecting the opposite end of said flexible shaft to apparatus the motion of which it is desired to record.

5. In combination with a meter having a rotatable spindle, a removable pinion normally carried by said spindle, and a register normally carried by said meter and driven by said pinion, of a support, a shaft carried by said support, a driving connection to said shaft engageable with said spindle when said register and said pinion have been removed, said shaft having means for removably receiving said pinion, means carried by said support for removably supporting said register in driven relation to said pinion while supported on said shaft, and a recorder driven by said shaft.

6. In combination with a meter having a rotatable spindle, a removable pinion normally carried by said spindle, and a register normally carried by said meter and driven by said pinion, of a support, a shaft carried by said support, a driving connection to said shaft engageable with said spindle when said register and said pinion have been removed, said shaft having means for removably receiving said pinion, and means carried by said support for removably supporting said register in driven relation to said pinion while supported on said shaft.

7. A meter test mechanism comprising a recorder, means for driving said recorder having a coupling element for attachment to the driving spindle of a meter in place of the register normally associated therewith, and a support associated with said recorder having means for removably carrying the register removed from said meter in driven relation to said driving means for actuation of said register in normal manner from said meter.

ROBERT E. FERGUSON.